Figure 1:
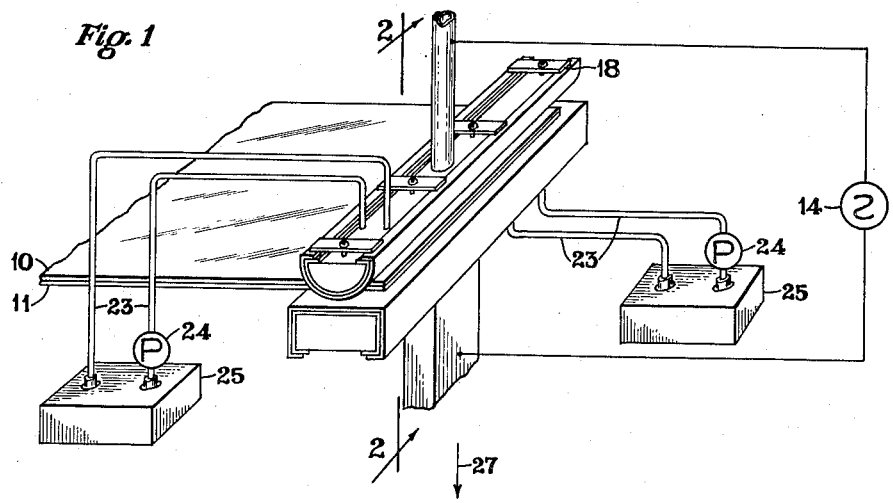

Jan. 26, 1954     C. M. ZOUBEK     2,667,437
METHOD OF SEALING POLYETHYLENE FILMS
Filed Oct. 11, 1949

INVENTOR.
Charles M. Zoubek
BY
R. G. Story
ATTORNEY

Patented Jan. 26, 1954

2,667,437

UNITED STATES PATENT OFFICE 2,667,437

METHOD OF SEALING POLYETHYLENE FILMS

Charles M. Zoubek, Oak Lawn, Ill., assignor to Swift & Company, Chicago, Ill., a corporation of Illinois Application October 11, 1949, Serial No. 120,784

1 Claim. (Cl. 154—126.5)

The present invention relates to a method and apparatus for producing a seal between two portions of a thermoplastic material, such as polyethylene or the like.

The principal object of the present invention is to provide a method and apparatus for joining portions of a thermoplastic material of a type which may not be sealed by dielectric heating because of the low dielectric loss factor of the material and which it is not desirable to seal with a hot iron because of the problems and difficulties encountered. Polyethylene is a typical example of such a material.

Materials having characteristics similar to polyethylene are difficult to seal with a hot iron because the heat of the iron should only be applied to the thermoplastic material for the very short period of time sufficient to soften the material but not long enough to cause it to run. As the material softens, pressure should be applied thereto with a cold object to hold the material in place and to cool it until it becomes self-sustaining. It is impractical to use two separate objects, one for the heating and one for the cooling. With the use of a hot iron, the seals normally obtained between two sheets of polyethylene are generally rough, uneven, with possibilities of imperfect sealing.

A further problem that is encountered is that impurities, particularly water or grease, on the two surfaces to be joined prevent a satisfactory seal from being obtained. Polyethylene is being used, among other things, for the packaging of oleomargarine. In placing a formed block of such a substance within a polyethylene bag, extreme care must be taken not to contact the surfaces along which the bag is to be sealed. Despite the precautions a smear is often made across the mouth of the bag, which smear must be removed or a new bag substituted before the bag is sealed. Through the use of the present invention a seal may be obtained despite the presence of such impurities.

While other thermoplastic films are heated dielectrically and sealed, this has not been possible with polyethylene and similar plastics because of their low dielectric loss factor. The amount of heat obtained when a voltage is impressed across the material is a function of the dielectric loss of the material. Another example of a plastic with a low dielectric loss is polytetrafluoroethylene.

When the dielectric loss is low the heat generated is relatively small and is insufficient to raise the temperature of the material to a point at which the material will join with a similar sheet. Undoubtedly, some heat is generated in low dielectric loss materials but it is so small that it is dissipated at least as fast as it is produced. The present invention makes available the desirable characteristics of dielectric heating in the joining of materials having a low dielectric loss factor.

A further object and advantage of the present invention is that it enables the dielectric heating of materials which have a low dielectric strength. When the dielectric strength is low, the maximum voltage which may safely be impressed between the electrodes is small. As a result, those materials may be difficult or slow to heat with the lower voltages necessitated by the characteristics of the material. With the present invention the maximum voltage imposed on such material may be considerably increased.

Figure 2:
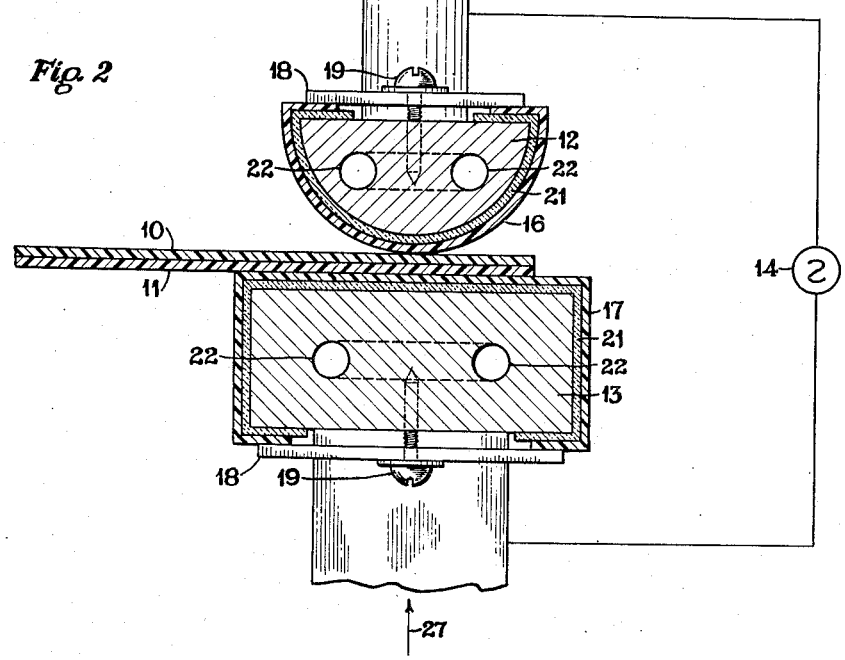

Additional objects and advantages will become apparent from the following description taken in conjunction with the drawings in which:

Fig. 1 is a perspective view in diagrammatic form of an embodiment of the invention; and Fig. 2 is a section taken at line 2—2 of Fig. 1.

The two polyethylene sheets 10 and 11 to be joined or sealed are placed between a pair of electrodes 12 and 13 which are suitably connected to a high frequency generator represented diagrammatically at 14. Buffers 16 and 17 are placed to either side of the polyethylene sheets 10 and 11 at the area to be joined. The buffers may be loose sheets of a suitable material. However, it is more satisfactory to have the buffer material positioned about the face of the electrodes 12 and 13 and secured thereto by means of clamps 18. Threaded bolts 19 received in holes tapped in the electrodes draw the clamps 18 to the electrode to hold the buffer in place.

A thermal insulation material 21 is positioned between the buffers 16 and 17 and the respective electrodes 12 and 13 to minimize the heat transfer between the buffer and the electrode. A pair of communicating openings 22 running longitudinally through the electrodes allows coolant to be pumped through the electrode to prevent any appreciable temperature rise in the electrode in the event that some heat does pass through the insulation material 21. Pipes or hoses 23 connect openings 22 with a pump 24 and a supply tank 25 to provide the desired circulation of coolant through the openings.

Suitable means are provided to apply pressure between the electrodes, as represented by the force arrows 27 in Fig. 2. Means which will supply a pressure of approximately 5 to 10 pounds per square inch will be satisfactory under normal circumstances.

Materials suitable for buffers preferably have the following characteristics:

1. The buffer material must have a relatively high dielectric loss factor. The dielectric loss factor is the product of the dielectric constant and the power factor. Thus, normally, both the dielectric constant and the power factor must be relatively high unless one or the other is unusually so.

Materials having a dielectric loss factor of approximately 0.05, or higher, will satisfactorily meet this requirement. This figure is what may be termed a high dielectric loss. A loss factor of approximately 0.001, or below, is representative of materials having a low dielectric loss. Materials having a dielectric loss intermediate of the two given figures will produce proportionately good or bad heating results in response to having a high frequency voltage impressed across them.

2. The buffer material should have a high thermal conductivity. The heat generated in the buffer material should be transmitted as rapidly as possible to the materials to be joined or sealed. If the thermal conductivity is low, the temperature of the buffer material will be raised excessively before the material to be sealed is sufficiently heated.

3. The buffer material either should not be thermoplastic or, if thermoplastic, should have a softening point sufficiently above the softening point of the material to be joined to prevent any appreciable softening of the buffer.

The term "buffer material" is defined as a material having the foregoing three characteristics.

In addition, the buffer material will preferably have a slight amount of resiliency. A long-chain synthetic polymeric amide with recurring amide groups as an integral part of the main polymer chain and with a softening point of approximately 100° F., or more, above that of the polyethylene, or other material being joined, will be suitable for a buffer material. A product known commercially as nylon FM–10001 is an example of that synthetic material.

In sealing two portions of polyethylene, or the like, the portions are placed between the electrodes, as illustrated in Figs. 1 and 2. The electrodes are brought together to either side of the polyethylene, thus bringing the buffers into contact with the polyethylene. A high frequency voltage is impressed across the electrodes thereupon heating the buffer and the polyethylene. As the polyethylene softens, the pressure between the electrodes causes a slight running of the polyethylene material and insuring that the sheets "weld" together along the desired sealing line. When the softening and welding have taken place, the imposed voltage is removed whereupon the heated material cools relatively rapidly because of the small mass of material that has been heated and the large surface area for conduction and radiation of the remaining heat. This rapid cooling causes a smooth, even seam to be made and speeds the processing of the material. After the material has cooled sufficiently to become self-sustaining, the pressure between the electrodes is released.

With a pair of flat-faced electrodes, the amount of pressure applied might be quite critical because it would have to be just sufficient to cause the desired amount of running of the polyethylene without resulting in an excessive amount thereof. By forming at least one of the electrode faces with a curvilinear shape, as illustrated by electrode 12 in Figs. 1 and 2, this critical feature is eliminated. With such an electrode the pressure may always be made at least equal to or greater than the desideratum, in which case the running may be slightly excessive along the line of maximum pressure. However, from that line outwardly to either side, the amount of pressure and the running will be gradually less with the resultant effect that at at least some point between the line of maximum pressure and the line of minimum pressure, a perfect seal will be obtained.

Difficulties have been encountered in the heat sealing of polyethylene films by means of a hot iron when impurities, such as water or grease, were on the faces of the polyethylene film along the line at which a seam was to be made. This has been particularly noticeable in the packaging of oleomargarine. Extreme precautions are necessary to prevent the deposit of any such foreign material because, otherwise, it must be removed before a satisfactory seal can be made. With the present invention such precautions are not necessary. Uniformly satisfactory seals are obtained despite the presence of such foreign material as grease or water on the surfaces to be joined.

Various modifications will be apparent to those skilled in the art and, for this reason, it should be remembered that the described specific embodiment is for the purposes of compliance with section 4888 of the revised statutes and should not be construed as imposing unnecessary limitations on the appended claim.

In some instances, the provisions for cooling the electrodes or for insulating the buffers from the electrodes may be eliminated. This will be particularly true where only intermittent seals are being made with the electrodes.

It will also be apparent that the described method and apparatus can be utilized for the heating of a single sheet of low loss dielectric material. In such case, or in cases where the two low loss materials being joined have a relatively high thermal conductivity, it may be necessary to use a buffer film only on one side of the sheet of said material.

I claim:

A method of joining two pieces of a thermoplastic material of a type having a low dielectric loss factor including the steps of placing said portions together, placing a buffer material to either side of the portions and in contact therewith, pressing an area of the buffer material and said portions against each other, and impressing a high frequency electric field across said area, restricting the temperature rise to the material and the buffer, removing said high frequency electric field after said material has softened, and subsequently discontinuing said pressing after the material has become self-sustaining.

CHARLES M. ZOUBEK.

References Cited in the file of this patent

UNITED STATES PATENTS

| Number | Name | Date |
|---|---|---|
| 2,404,191 | Quayle | July 16, 1946 |
| 2,406,714 | Strickland | Aug. 27, 1946 |
| 2,407,833 | Jablonsky | Sept. 17, 1946 |
| 2,474,977 | Hart | July 5, 1949 |
| 2,477,214 | Story | July 26, 1949 |
| 2,478,857 | Brown | Aug. 9, 1949 |
| 2,570,921 | Collins | Oct. 9, 1951 |

FOREIGN PATENTS

| Number | Country | Date |
|---|---|---|
| 555,054 | Great Britain | Aug. 3, 1943 |